Figure 1:
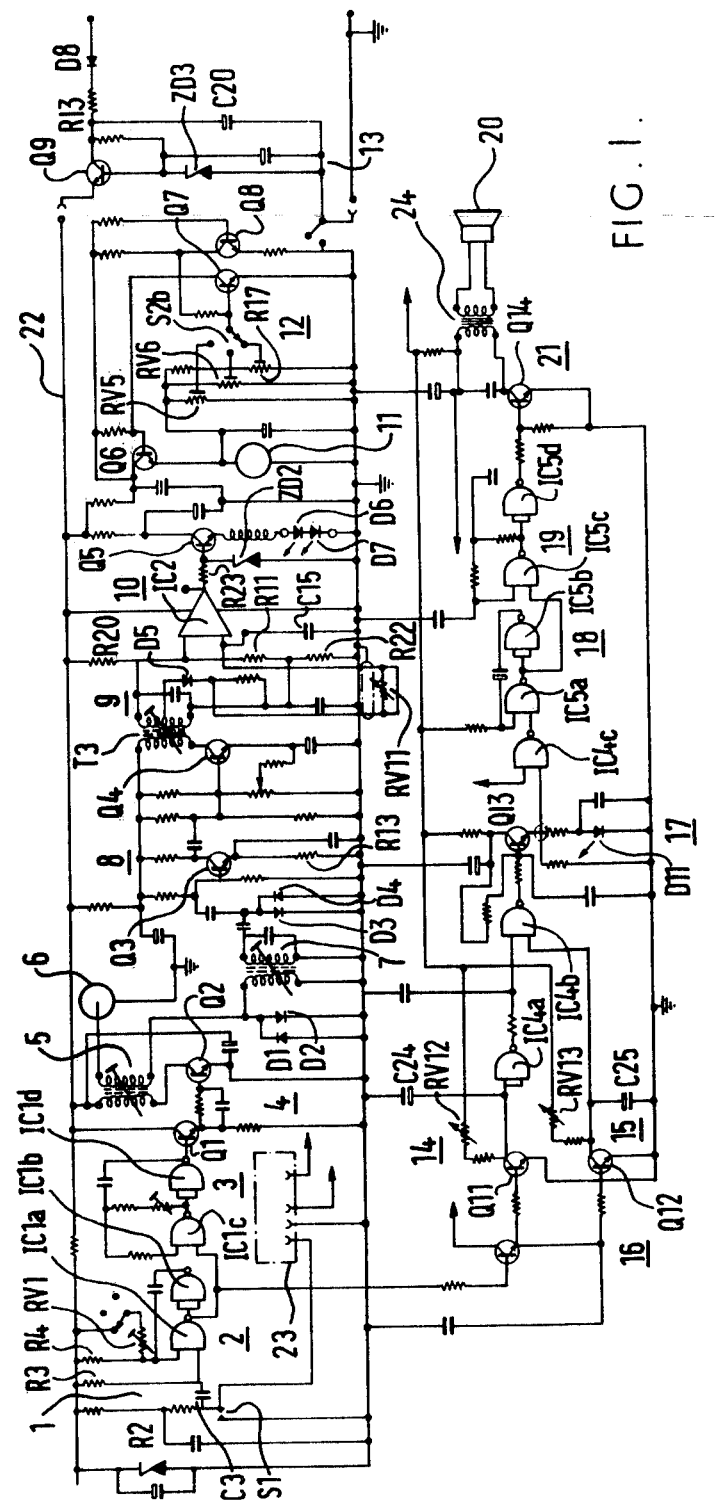

United States Patent [19]
Toubkin et al.

[11] 4,186,371
[45] Jan. 29, 1979

[54] ECHO SOUNDERS

[75] Inventors: Walter M. Toubkin, London; Alan J. Mulley, Stevenage, both of England

[73] Assignee: Space Age Electronics Limited, London, United Kingdom

[21] Appl. No.: 860,897

[22] Filed: Dec. 15, 1977

[30] Foreign Application Priority Data

| Dec. 17, 1976 [GB] | United Kingdom | 52743/76 |
| Mar. 15, 1977 [GB] | United Kingdom | 10818/77 |
| May 27, 1977 [GB] | United Kingdom | 22547/77 |
| Sep. 12, 1977 [GB] | United Kingdom | 37971/77 |

[51] Int. Cl.[2] .............................................. G01S 9/68
[52] U.S. Cl. .................................................. 367/109
[58] Field of Search .................... 340/1 C, 1 L, 3 C

[56] References Cited
U.S. PATENT DOCUMENTS

| 2,998,591 | 8/1961 | Lovett | 340/3 R |
| 3,407,398 | 10/1968 | Stearn | 340/1 L |
| 3,566,348 | 2/1971 | Leyden et al. | 340/1 C |
| 3,757,285 | 9/1973 | Ferre | 340/1 C |
| 3,793,618 | 2/1974 | Plangger | 340/3 C |
| 3,964,012 | 6/1976 | Yamamoto et al. | 340/3 C |
| 4,013,991 | 3/1977 | Balcom | 340/3 C |

Primary Examiner—Richard A. Farley
Attorney, Agent, or Firm—Fleit & Jacobson

[57] ABSTRACT

An echo sounder has conventional transducer means for transmitting and receiving pulses of energy and display means for providing a display indicative of the period between the transmission of a pulse of energy and the receipt of an echo pulse. The echo sounder includes suppressor means defining a variable alarm window during which period alone echo pulses are passed to an alarm device. In an embodiment designed for marine applications the display means comprises a rotor arm carrying a first light emitting device connected to the transducer means and a second light emitting device energised during the alarm window. A motor is provided for rotating the rotary arm which co-operates with a scale. An alarm device responds to each echo signal occurring during the variable alarm window.

7 Claims, 3 Drawing Figures

ECHO SOUNDERS

This invention relates to echo sounders.

It has been known for many years to use an echo sounder for fish detection and in one known type of echo sounder for fish detection an alarm is given when an echo is received from a fish; the alarm is usually of an audible type but could be of a visual type.

It is possible to use, in an echo sounder intended for fish detection, a rotary arm which carries a light emitting device connected to the output of the transducer which transmits the sonar pulses and which receives the fish echoes so that the light emitting device emits light on transmission of a sonar pulse and on receipt of a fish echo. In such an echo sounder it is usual to arrange a scale around the rotary arm and as the rotary arm passes the "12 o'clock" position a pulse of sonar energy is transmitted and as a result the light emitting device is illuminated. The sea bed does, of course, produce an echo and causes illumination of the light emitting device. When a fish is underneath the boat carrying the echo sounder it produces an echo which results in energisation of the light emitting device but in practice the period that the light emitting device actually emits light in response to this echo is very short. It is possible to provide two spaced light emitting devices of different colours co-operating with inner and outer scale to facilitate reading of the scale but it still can be difficult to notice a fish echo. In another known type of echo sounder for use in fish detection a char recorder is used and has a strip of paper marked by a rotary arm to which signals representative of the echo are fed. The sea bed appears as a thick black line on such a chart and because of the difficulty of distinguishing fish adjacent to the sea bed from the sea bed, the "white line" feature was devised some years ago and this results in the sea bed appearing as a thin black line followed by a white line followed by a thick black line which tails off. While this does enable fish near to the sea bed to be detected with relative ease it does require large lengths of paper chart. A further problem with all fish detection echo sounders is that spurious echoes produce outputs and spurious echoes can, for example, be produced by air bubbles, seaweed etc.

It is an object of this invention to provide an improved echo sounder.

According to this invention there is provided an echo sounder comprising transducer means for transmitting and receiving pulses of energy, display means for providing a display indicative of the period between the transmission of a pulse of energy and the receipt of an echo pulse, suppressor means for suppressing echo signals either other than after the end of a first variable period beginning with the transmission of a pulse and before the end of a second variable period beginning with the transmission of a pulse or after the end of the first variable period and before the end of the second variable period. Where an echo sounder is intended for use in fish detection it would normally be arranged that the suppressor means would suppress echo signals other than after the end of the first variable period and before the end of the second variable period. By this means echoes from the sea bed and from air bubbles occurring near the keel of the ship can be entirely eliminated which is very desirable.

As described above there is a "window" between the end of the first variable period and the end of the second variable period and this can be considered as a "variable window".

In the case of a marine application, the echo sounder is conveniently of the rotary arm type and comprises a rotary arm carrying a light emitting device connected to the transducer means, a motor for rotating the rotary arm, a scale with which the arm co-operates, and means for causing the transducer means to transmit a pulse of sonar energy when the rotor arm passes a datum position.

Preferably the rotary arm carries a further light emitting device arranged to be energised from the end of the first period to the end of the second period.

Preferably the echo sounder comprises an alarm device responsive to each echo signal which is not suppressed by the suppressor means.

Preferably the alarm device, which may, for example, be a loudspeaker, is arranged to be energised for a fixed period.

For this purpose, a monostable may be provided through which echo signals are supplied to the alarm device.

Preferably the suppressor means comprises a first variable period signal generator which sets the first variable period and a second variable period signal generator which sets the second variable period.

The variable period signal generators can be monostables. Alternatively each variable period signal generator comprises a capacitor connected in series with a variable resistor between supply terminals and a capacitor discharge circuit connected across the capacitor and arranged to be rendered operative by each transmitted pulse.

Preferably the output of one of the variable period signal generators is connected through an inverter to one input of an AND gate, the other input of which receives the output of the other variable period signal generator, the output of the AND gate being arranged to control the passage of the echo signals through a gate.

The second variable period may be variable to an extent that its period is equal to the period between the transmission of successive pulses.

For this purpose the second variable period signal generator may be variable to an extent that its period is greater than that between the transmission of successive pulses and is connected directly or indirectly to the transducer means so as to re-set on the transmission of each pulse.

In a marine echo sounder in accordance with this invention in which the suppressor means is arranged to suppress echo signals other than after the end of the first variable period and before the end of the second variable period, the suppressor means is desirably arranged not to suppress echo pulses during short periods after the end of the first variable period and after the end of the second variable period respectively, the second variable period being variable to the extent that it is shorter than the first variable period.

Where the second variable period is longer than the first variable period the last mentioned feature will have no effect but where the second variable period is variable to be shorter than the first variable period there will be two short periods during which the signals will be passed.

This arrangement is desirable in an echo sounder for use for fish detection and it is desired to provide an anchor alarm. Where the second variable period is shorter than the first variable period, the length of the first and second variable periods are set such that the sea bed echo occurs between the said short periods so that it is suppressed but if ever the boat begins to drag its anchor the position of the sea bed echo will vary and an echo signal will be passed; in this case it is, of course, desirable that the echo sounder includes an alarm.

The echo sounder would not, be used as an anchor alarm at all times but only when the ship is at anchor.

Preferably the suppressor means comprises first and second differentiating circuits connected to the output of the first and second variable period signal generators respectively, a first OR gate to the inputs of which the outputs of the differentiating circuits are connected, and a second OR gate to the inputs of which the outputs of the AND gate and the first OR gate are connected, said second OR gate being connected to the gate.

The feature of providing two short periods at the end of the first and second variable periods may also have industrial applications.

Furthermore, where the suppressor means is arranged to operate in this way an echo sounder can be upwardly directed and carried on a boat for measuring the height of a bridge and will only respond to echo signals occurring after the end of the first variable period and before the end of the second variable period. In this case, the echo sounder would require an air transducer as opposed to a water transducer which would be required by an echo sounder intended for use in fish detection.

Further, an echo sounder including such suppressor means could also be sidewardly directed for detecting the position of a frogman or could be sidewardly directed within a harbour to measure the position of a harbour wall.

Marine echo sounders are normally transmit pulses of sonar energy and this is also true of the other types of echo sounders described above apart from the alarm type echo sounder which may use sonar energy but may use microwave energy; an alarm echo sounder would not normally be of the Doppler type.

It is hitherto been assumed that the variable window is continuous but in certain applications it may be preferred to provide breaks in the window for example, in the application of the invention to an alarm system.

In the application of an echo sounder in accordance with this invention to control the level of a liquid or other material in a tank or silo, it is possible to bond the transducer to the outside of the bottom (base) of the container of the liquid in which case the transmitted signal will be transmitted through the container (which may be of metal, plastics or wood) and through the liquid to the interface between the liquid and air and, of course, in this case a sonar signal would be used. The signal would be reflected from the interface between the liquid and air and will pass back through the base of the container to the transducer.

All the applications of height measurement of liquid or material described above are non-invasive and important applications of such an echo sounder are pressure containers, acid containers, control of food of pure liquid processes where an invasive system might be detrimental or objectionable for some other reason.

In certain applications the transducer could be sited on the base of the container inside the container but directed upwardly. As previously the sonar pulse would be reflected by the interface between the liquid and air. Moreover, the transducer could be angled; the width of the window and the calibration would have to be altered in accordance with the angle.

It is feasible to use the variable window to control a process which has hitherto been difficult to control. For instance, in the case of a large coal bunker one could provide an array of more than one transmitting transducer and/or more than one receiving transducer. These could be directed downwardly from the top of the bunker and could be at one side of the bunker, in the centre of the bunker and at the other side of the bunker and it would be possible to use the variable window to automatically control the warning of an individual as to the height of the coal or other material in the bunker; instead of warning an individual a relay could be actuated. The warning would be given when the array of transmitting and/or receiving transducers all indicate that the material has dropped to a predetermined level. Alternatively, the array of transmitting and/or receiving transducers can indicate when a part or all of the bunker has been filled to the desired level with coal or other material.

Where the echo sounder incorporating the variable window is used to control liquid within a container, it is possible to relate the height of the liquid to the volume within the electronic circuit. It should be appreciated that various waterboards are now insisting that industrial firms have their water supply metered and this may be expensive. By utilising an echo sounder using a variable window the amount of water can be regulated to keep to the optimum height required for process while obviating water waste. The volume of water for a given height is affected by temperature and therefore the ambient temperature can be taken into account by including in the electronic circuit a temperature sensing device. Alternatively, there could be provided a fixed distance reference and a temperature compensator factor could be utilised to compensate for temperature changes in the liquid or solid affecting its change of height.

In U.S. Patent Application Ser. No. 860,896, filed Dec. 15, 1977 there is disclosed an echo sounder in which there are two display means one of which can be rendered inoperative and in the illustrated embodiments of that specification a rotary arm type display is rendered inoperative after the echo sounder has been set up and a repeater meter type display remains operative, its drive circuit incorporating an oscillator.

The feature of having two displays one of which can be rendered inoperative is applicable to an echo sounder in accordance with this invention having a variable window and, assuming the echo sounder is intended for use in fish detection, it could be arranged that the variable window is such that it is known that the echo signals are passed only from fish. Once the operator has set the variable periods and the gain using the rotary arm type display which is relatively easy to understand, the rotor drive motor would be switched off.

It should also be appreciated that it is possible to have the echo sounder envisaged in the preceding paragraph in two parts. The first or control part would include the electric motor and the rotary arm type display whereas the other part would include the electronic circuit including, if necessary, the electronic clock which controls the transmission of the sonar pulses and the circuit providing the variable window, the amplifiers etc., and the transducer. The visual display with the electric motor will be associated with a manual control panel.

One advantage of separating the main control unit from the electronic circuit is that the main instrument can be connected to the electronic circuit whereupon the user can switch on the electric motor of the main instrument and can obtain a visual display of the transmitted sonar pulse, the depth echo (i.e. the echo from the sea bed), any non-desired echoes and the beginning and end of the variable window assuming that an indication is given by, for example, energising the light emitting device at the beginning and end of the variable window. Any person could then site the transmitter, adjust the gain control and adjust the window to the required extent.

The use of a separate display and control unit obviates the need for a portable oscilloscope or the like. After it has been situated and operated to control the electronic circuit, the electronic circuit can be disconnected therefrom whereafter the electronic circuit will operate from its own electronic clock as described above. This will result in increased accuracy because of the elimination of the error resulting from variable speed of the motor.

The main unit including the display can be moved from one site to another; the electronic unit can be operated from its own internal battery or from an external supply and can be fully portable. Each main unit could have its own battery.

It should be appreciated that a two part echo sounder is possible even if there is no rotary arm type display but an oscilloscope display replacing the rotary arm display.

A plurality of suppressor means connected in parallel could be provided and provide a plurality of variable windows.

Reference has previously been made to an echo sounder in accordance with this invention being used to control the level of liquid in a container. The echo sounder may also be used to control the rate of liquid flow in a process. For this purpose the liquid will be arranged to flow through a channel and the apparatus used to control the height of the liquid in the channel as that would be dependent upon the rate of liquid flow.

Echo sounders in accordance with this invention will now be described, by way of example only, with reference to the accompanying drawings, in which FIG. 1 and FIG. 2 together are a circuit diagram of an echo sounder in accordance with this invention; and FIG. 3 which is a circuit diagram of a further modification of the part of the echo sounder shown in FIG. 1.

Figure 2:
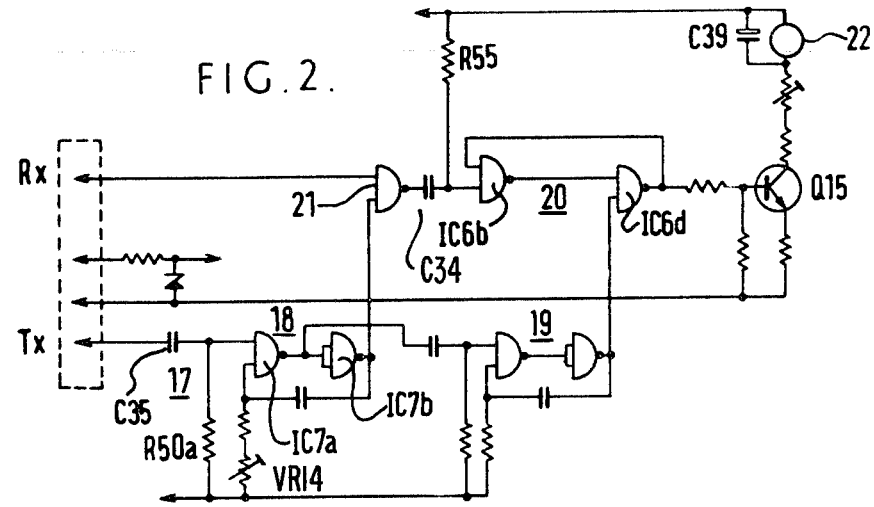

The echo sounder of FIGS. 1 and 2 employs a conventional rotary arm carrying light emitting diodes at one end and mounted on a shaft of an electric motor; the diodes rotate around a scale calibrated in units of depth. A magnet is mounted on the other end of the rotary arm and passes a reed relay in a datum position of the rotary arm in relation to the scale whereupon a transducer coupled to the reed relay is caused to emit a sonar signal. Echo signals received by the transducer are applied to the light emitting diodes which thereupon flash adjacent to the scale, the position of the light flash adjacent to the scale giving an indication of depth. The diodes also flash in response to the transmitted pulses.

A meter repeater is connected to receive a signal representative of the elapsed time between the transmission of the sonar pulse and the receipt of an echo signal and may be disposed in a location remote from the rotary arm to give a display of the depth from the object giving rise to the echo signal; that object may of course be the sea bed.

In detail, referring to FIG. 1, the reed relay is designated by S1 and on closure of the reed relay S1 because the magnet passes it, the voltage at the junction of the resistor R2 and the reed relay S1 falls thereby producing a negative going pulse. This negative going pulse is differentiated by differentiating circuit 1 and applied to a monostable 2 to produce a pulse output of defined length. The monostable 2 has its output applied to an oscillator 3 which produces an output signal at the frequency of 150 kHz which output has an envelope defined by the output pulse of the monostable 2 and is applied through a driver circuit 4 and an output transformer 5 to a transducer 6. Echo signals received by the transducer 6 are applied to the primary winding of an input transformer 7 which is in series with the secondary winding of the transformer 5. The output of the transformer 7 is applied to a two stage amplifier 8 having a variable gain to a detector circuit 9. It should be appreciated that the received echo pulse is at the frequency produced by the oscillator 3 and has an envelope which is detected by the detector 9. The output of the detector 9 is applied to a pulse width discriminator circuit 10, the function of which is to suppress pulses having a pulse width less than a minimum, the output of the discriminator circuit 10 is applied to the light emitting diodes D6 and D7.

The motor is denoted at 11 and its speed is controlled by a speed control circuit 12 which is energised from the supply through a voltage regulator 13.

A repeater meter is connected to the output of the pulse width discrimination circuit 10 in a manner which will be described later with reference to FIG. 2.

A first variable period circuit 14 and a second variable period circuit 15 both receive the output of the monostable 2 through a buffer 16. A gate IC4b forming part of circuit 15 produces an output from the end of a first variable period set by circuit 14 to the end of a second variable period set by circuit 15. This output is fed through a drive circuit 17 to gate IC4c which also receives the output of circuit 10 and only passes the output of discrimination circuit 10 during the output pulse of gate IC4b. Drive circuit 17 drives a light emitting diode D11 carried by the rotary arm. Each output pulse of gate IC4c triggers a monostable 18 which controls an oscillator 19; oscillator drives an alarm 20 through a drive circuit 21.

The buffer 16, variable period circuits 14 and 15, the drive circuit 17 and the gate IC4c as described in the preceding paragraph together provide a variable alarm window.

In use on each occasion the reed relay S1 closes, the transducer 6 transmits a sonar pulse, received echo pulses being applied through the transformer 7, the amplifier 8, the detector 9 and the pulse width discrimination circuit 10 to the diodes D6 and D7 which flash so that the depth can be read from the scale and the rotor arm. Simultaneously, the repeater meter has a deflection corresponding to the depth of the echo giving rise to the pulse.

In more detail, when the reed relay S1 is closed the voltage at its junction with the resistor R2 falls to produce a negative going pulse which is differentiated by differentiator 1 consisting of the capacitor C3 and the resistor R3. This produces a sharp negative going spike at the input of the gate IC1a of the monostable 2. The monostable formed of the gate IC1a and the gate IC1b thereupon triggers producing an output pulse applied to the gate IC1c of the oscillator 3 which also includes gate IC1d; the oscillator 3 is an astable multivibrator.

The motor 11 has three possible speeds as will be described later and consequently the scale has three ranges marked on it. At the highest speed a resistor RV1 is connected in series with resistor R4 connected to the other input of the gate IC1a in order to shorten the pulse length.

The output of the oscillator 3 drives the driver circuit 4 having transistors Q1 and Q2, transistor Q2 being connected in series with the primary winding of the transformer 5.

Diodes D1 and D2 are connected across the primary of the transformer 7 and diodes D3 and D4 are connected across the secondary of the transformer 7 in order to clip the input from the transmitted pulse to the amplifier 8. The first stage of the amplifier 8 includes a resistance coupled transistor Q3; the second stage of the amplifier 8 includes a transistor Q4 whose output is applied through a transformer T3 to the tuned detector circuit 9 which includes detector diode D5. The pulse width discrimination circuit 10 includes an operational amplifier IC2 which is operated in open loop and therefore functions as a comparator. The output of the detector circuit 9 appearing at the cathode of the diode D5 is connected through a variable resistor RV11 to charge up a capacitor C15 connected between one input of the comparator IC2 and earth. The other input of the operational amplifier IC2 receives a reference potential from a voltage divider constituted by resistors R20, R21 and R22. In the absence of an output from diode D5 the input to the comparator IC2 from the voltage divider keeps it in the condition that its output remains at about 2 volts above earth. When a pulse appears on the output of the detector D5 it is integrated by the capacitor C15 and provided the pulses are of sufficient duration the output of the comparator IC2 will rise to within a volt of the rail volts which is approximately 9 volts. It will be seen that the function of the discrimination circuit 10 is to suppress voltage spikes having a very narrow width and therefore the discrimination circuit ensures that the echo sounder will not respond to spurious echoes of very short length. Variable resistor RV11 effectively controls the time constant of the discrimination circuit and it should be appreciated that the purpose of the discrimination circuit is to eliminate ignition interference which can well occur on small boats.

The output of the comparator IC2 is applied to the base of a transistor Q5, which acts as an emitter follower through a resistor R2; the light emitting diodes D6 and D7 are part of the emitter load of the transistor Q5. Additionally, the base of the transistor Q5 is connected to earth through a zener diode D2, the function of resistor R23 and zener diode ZD2 being clamped to the base of the transistor Q5 to 7½ volts thereby limiting the maximum current through the light emitting diodes D6 and D7.

The motor speed control circuit 12 is designed to provide three motor speeds and in detail a proportion of the voltage occurring across the motor 11 is selected by means of the switch S2b which selects one of the three preset variable resistors RV5, RV6 and RV7. The selected voltage is applied to the base of a transistor Q7 which drives a transistor Q6 whose collector-emitter path is connected in series with the motor 11 across the supply voltage.

It should be appreciated that the motor speed control circuit 12 is effectively a closed loop.

A transistor Q8 is included in the motor speed control circuit 12 to provide thermal compensation and acts to offset the thermal drift in the motor speed control circuit.

The supply rail 22 from which the motor speed control circuit and the transistor Q5 are energised through a switch S4a is connected to the main supply through the voltage regulator circuit 13 which comprises a transistor Q9 controlled by a zener diode ZD3. The voltage regulator includes a diode D8 for reverse polarity protection; a resistor R13 and a capacitor C20 form an input filter.

The variable period circuit 14 comprises a transistor Q11, capacitor C24, variable resistor RV12 and gate IC4a whereas variable period circuit 15 comprises transistor Q12, capacitor C25, variable resistor RV13 and gate IC4b. Assuming initially there is no input through buffer 16, the capacitor C24 of variable period circuit 14 will be charged up to the supply voltage so that both inputs to gate IC4a will be "1" and its output would therefore be "0". Capacitor C25 will similarly be charged to the supply voltage so that the two inputs to the gates IC4b will be "0" and "1" respectively so that its output will be a "1" that is a high voltage. Drive circuit 17 will therefore not energise the light emitting diode D11 and gate IC4c will therefore not pass the output of the pulse width discrimination circuit 10, i.e. the output of operational amplifier IC2.

When the buffer 16 receives a transmitted pulse Tx both transistors Q11 and Q12 of variable period circuits 14 and 15 conduct and discharge the capacitors C24 and C25 respectively. Under this condition both inputs of gate IC4a are low, and consequently its output will be a "1". The two inputs to gate IC4b will be a "1" and a "0" respectively so that output will be a "1", that is a high voltage and drive circuit 17 will remain in the condition that it does not energise light emitting diode D11 or allow gate IC4c to pass the output signal of the pulse discrimination circuit 10.

Both capacitors C24 and C25 begin to charge up through variable resistors RV12 and RV13 respectively and assuming capacitor C25 charges up more quickly its output will reach the level at which it is a "1" first. The output of gate IC4a remains a "1" so that the two inputs to gate IC4b are "1" and its output will be a "0", that is a low voltage. Consequently, drive circuit 17 will energise light emitting diode D11 and will allow gate IC4c to pass the output of the pulse width discrimination circuit 10. This condition continues until capacitor C24 has charged up to the extent that the voltage across it is such that the two inputs to gate IC4a are "1" so that its output is a "0", whereupon the output of gate IC4b reverts to being a "1" cutting off the transistor Q13 of drive circuit 17 so that light emitting diode D11 is no longer energised and gate IC4c no longer passes the output of the pulse width discrimination circuit 10. This condition continues until the next transmitted pulse Tx is applied to the buffer 16.

During the period that the drive circuit Q13 does energise the light emitting diode D11 and does allow gate IC4c to pass a signal the effect of illumination of the light emitting diode D11 will be, provided the rotary arm is rotating at a sufficiently high speed, an arc of light adjacent to the scale of the echo sounder. During this arc, that is to say during this band of depth within the sea any received pulse passed by the pulse width discrimination circuit 10 passes through gate IC4c and triggers monostable 18. During the output pulse of monostable 18, oscillator 19 oscillates at a frequency in the audio range and energises the alarm 20 so that an echo in this range will energise the alarm attracting attention of the user. The intended use is for fish detection.

The monostable 18 is of a design very similar to that of monostable 2 and includes gates IC5a and IC5b. Further, the oscillator 19 is very similar in design to the oscillator 3 and includes gates IC5c and IC5d but is, of course, arranged to operate at a lower frequency. The drive circuit 21 has a single stage of amplification provided by transistor Q14 coupled to the loudspeaker 20 through a transformer 24.

It should be appreciated that in the event that a further transmitted pulse is received before the capacitors C24 and C25 are fully charged up, they will be again completely discharged by the transistors Q11 and Q12 and equally if one of those capacitors is fully charged and the other is not they will both be completely discharged by the further transmitted pulse Tx.

The repeater meter drive circuit is shown in FIG. 2 and is connected to the four connection terminals 23 illustrated in FIG. 1. These connection terminals 23 provide the output of the reed relay S1, earth, a 9 volt supply, and the output of the comparator IC2. It will be appreciated that the reed relay output constitutes the transmitted pulse and the output of the comparator IC2 constitutes the received pulse, these being referred to as the received pulse Tx or the received pulse Rx respectively.

The remote repeater meter includes a circuit for generating voltage proportional to the time between the transmitted pulse Tx and the received pulse Rx minus a deduction corresponding to the depth of the keel below the transducer as the user is often interested in the depth below the keel rather than the depth below the transducer. Referring to FIG. 2, the transmitted pulse Tx is differentiated by a differentiating circuit 17 and is used to trigger a monostable 18. The width of the output pulse of the monostable 18 is variable to correspond with the actual depth below the keel of the transducer and the negative output edge of the monostable 18 is used to trigger a monostable 19 having a 2 ms output pulse. The output of the monostable 19 is used to trigger a bistable 20.

The positive output of the monostable 18 is used to inhibit a gate 21 through which received pulses Tx are applied to re-set the bistable 20. The output of the bistable 20 is a pulse proportional to the time between a transmitted pulse and a received pulse minus a deduction for the depth between the transducer and the keel and is integrated and applied to the meter 21.

In more detail, the differentiating circuit 17 is constituted by a capacitor C35 and a resistor R50a and the monostable 18 includes gates IC7a and IC7b; the period of the monostable 18 is determined by a variable resistor VR14.

The bistable 20 includes gates IC6b and IC6d the gate IC6d receiving the output of the monostable 19. Gate IC6b receives the received pulses Rx through the gate 21 after differentiation by a differentiating circuit constituted by a capacitor C34 and a resistor R55.

The integrator is constituted by a capacitor C39 connected across the meter 22, the output of the bistable 20 being applied to the meter 22 with its integrator C39 through a drive transistor Q15.

In the circuit shown in FIG. 1, in the event that the variable period circuit 15 has a longer period than the variable period circuit 14 drive circuit 17 will never energise light emitting diode D11 and will never cause gate IC4c to pass the output of the pulse width discrimination circuit 10. For most purposes this is quite adequate.

Figure 3:
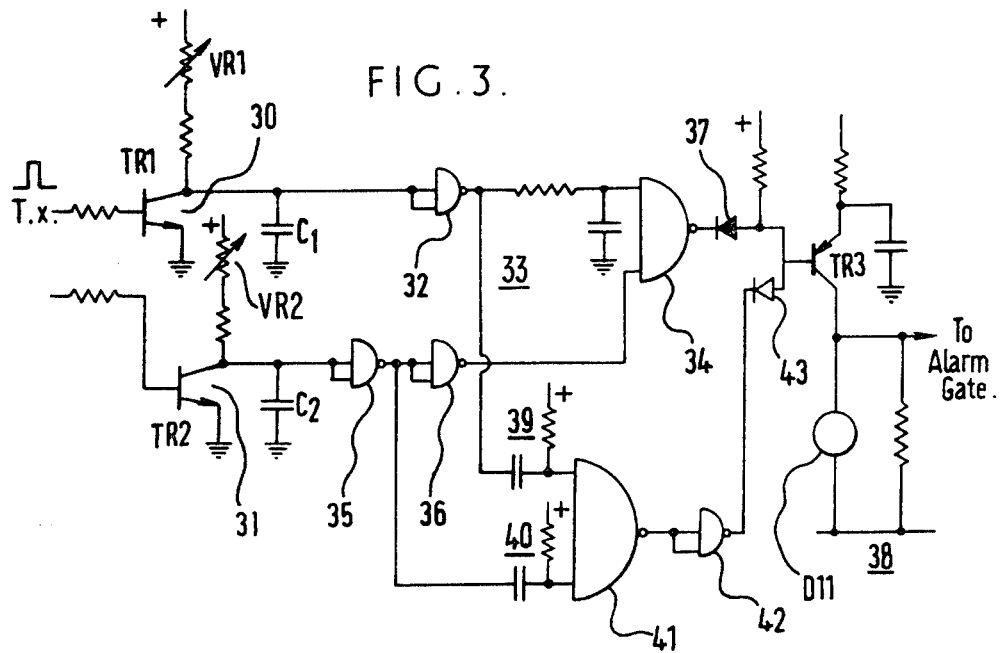

In the modification illustrated in FIG. 3 the variable period circuits 14 and 15 and the drive circuit 17 are replaced by the circuit shown in that drawing.

Referring to FIG. 3, the output of the buffer 16 is applied to two variable period circuits 30 and 31; the output of the variable period circuit is connected through an inverter 32 and a delay circuit 33 to one input of a gate 34, whereas the output of the variable period circuit 31 is connected through two inverters 35 and 36 in series to the other input of the gate 34.

The variable period circuits 30 and 31 are similar in design to the variable period circuits 14 and 15 respectively. In the absence of any transmitted pulse Tx, capacitors C1 and C2 of variable period circuits 30 and 31 respectively will both be charged to the supply voltage so that the upper input to the gate 34 will be a "0" and the lower input of the gates 34 will be a "1", with the result that the output of the gate 34 will be a "1", that is a high voltage. This is applied through a diode 37 to the transistor TR3 of a drive circuit 38 similar to the drive circuit 17. Diode D11 will therefore not be energised. When a transmitted pulse Tx is received capacitors C1 and C2 are discharged by transistors TR1 and TR2 of the circuits 30 and 31 respectively and begin to charge up through the variable resistors VR1 and VR2 respectively. During the period that the potential differences across the capacitors C1 and C2 are both relatively small, both inputs to gate 32 are "0" with the result that its output is "1" whereas the output of the gate 36 will be a "0" so that the output of the gate 34 remains a "1", that is high. Assuming capacitor C2 charges up first the output of the gate 36 will change to being a "1" so that both inputs to gate 34 will be a "1" and its output will be a "0" whereupon transistor TR3 will conduct energising the diode D11 and opening the gate IC4c. As soon as capacitor C1 is charged, the output of the gate 34 goes to "1" cutting off the drive circuit 38.

The outputs of the gates 32 and 35 are connected through differentiating circuits 39 and 40 to the input of a gate 41 the output of which is inverted by an inverter 42 and applied through a diode 43 to the base of the transistor TR3; the manner in which gates 41 and 42 are connected together is such that if either input to gate 41 becomes a "0" the output of gate 42 becomes a "0", whereupon the drive circuits 38 will be energised.

In the condition that capacitor C2 charges up before capacitor C1, gate 34 produces a "0" output as has been previously explained and additionally when each of capacitors C1 and C2 reaches the fully charged state, gates 32 and 35 switch from "1" to "0" so that differentiating circuits 39 and 40 respectively produce short negative going pulses. In the event that capacitor C2 charges up before capacitor C1, the effect of a "0" at the output of gate 42 will be masked by the "0" at the output of the gate 34 because the "0" due to the negative going pulse produced by differentiating circuit 40 will be concurrent with part of the "0" produced at the output of the gate 34 and the "0" produced at the output of the gate 42 as a result the negative going pulse produced by the differentiating circuit 39 will effectively merely constitute a short extension of the "0" produced at the output of the gate 34. If on the other hand the settings of the variable resistors VR1 and VR2 are such that capacitor C1 charges up before capacitor C2 gate 34 will never produce a "0" with the result that the only "0" produced will be the two short narrow "0" pulses at the output of gate 42 which will appear as two short light arcs produced by the diode D11 adjacent to the scale. The angle between these two arcs will be dependent on the difference between the settings of the variable resistors VR1 and VR2 and an alarm signal will only be generated by the loudspeaker 20 by a received pulse occurring during one of these two short arcs.

In U.S. Pat. Application Ser. No. 860,896 there is disclosed an echo sounder having a meter repeater in which the motor can be de-energised and its timing function taken over by an oscillator. This feature could be used in conjunction with the variable alarm window of this application.

What is claimed is:

1. An echo sounder comprising transducer means for transmitting and receiving pulses of sonar energy, display means for providing a display indicative of the period between the transmission of a pulse of energy and the receipt of an echo pulse, said display means comprising a rotary member carrying first and second light emitting devices, said first light emitting device being connected to the transducer means, a motor for rotating the rotary member, a scale with which the rotary member co-operates, and means for causing the transducer means to transmit a pulse of sonar energy when the rotary member passes a datum position on said scale, an alarm device, and suppressor means through which the alarm device is connected to the transducer means, said suppressor means suppressing echo signals occurring at times other than after the end of a first variable period beginning with the transmission of a pulse of energy and before the end of a second variable period beginning with the transmission of a pulse of energy, said second light emitting device being energised from the end of said first variable period to the end of the second variable period.

2. An echo sounder as claimed in claim 1 wherein the suppressor means comprises a first variable period signal generator which sets the first variable period and a second variable period signal generator which sets the second variable period.

3. An echo sounder as claimed in claim 2 wherein each variable period signal generator comprises a capacitor connected in series with a variable resistor between supply terminals and a capacitor discharge circuit which is connected across the capacitor and is rendered operative by each transmitted pulse.

4. An echo sounder as claimed in claim 2 which comprises a gate and wherein the output of one of the variable period signal generators is connected through an inverter to one input of an AND gate the other input of which receives the output of the other variable period signal generator, the output of the AND gate being arranged to control the passage of the echo signals through the gate.

5. An echo sounder as claimed in claim 4 wherein the suppressor means does not suppress echo pulses during short period after the end of the first variable period and after the end of the second variable period respectively, the second variable period being variable to the extent that it is shorter than the first variable period.

6. An echo sounder as claimed in claim 5 wherein the suppressor means comprises first and second differentiating circuits connected to the output of the first and second variable period signal generators respectively, a first OR gate to the inputs of which the outputs of the differentiating circuits are connected, and a second OR gate to the inputs of which the outputs of the AND gate and the first OR gate are connected, said second OR gate being connected to the gate.

7. An echo sounder as claimed in claim 1 which comprises a plurality of suppressor means connected in parallel.

* * * * *